United States Patent [19]
Connor

[11] Patent Number: 5,524,804
[45] Date of Patent: Jun. 11, 1996

[54] LOCK-OUT DEVICE FOR THREADING IN A STRIP GUIDE APPARATUS

[75] Inventor: Thomas M. Connor, Wilson, N.C.

[73] Assignee: Bridgestone/Firestone, Inc., Akron, Ohio

[21] Appl. No.: 388,070

[22] Filed: Feb. 14, 1995

[51] Int. Cl.⁶ .................................................. B65H 20/00
[52] U.S. Cl. ............................................. 226/17; 226/199
[58] Field of Search ............................... 226/17, 19, 189, 226/198, 46, 91, 179

[56] References Cited

U.S. PATENT DOCUMENTS

| | | | |
|---|---|---|---|
| 1,711,074 | 4/1929 | Winkle | 156/405.1 |
| 2,947,057 | 8/1960 | Meagher, Jr. et al. | 26/66 |
| 3,170,829 | 2/1965 | Batten | 156/405 |
| 3,269,627 | 8/1966 | O'Brien | 226/179 |
| 3,896,983 | 7/1975 | Weinguni | 226/198 |
| 3,974,953 | 8/1976 | Klose | 226/198 X |
| 4,049,486 | 9/1977 | Henley | 226/17 X |
| 4,750,660 | 6/1988 | Kamimura | 226/199 |
| 4,961,813 | 10/1990 | Bailey | 156/406.4 |

FOREIGN PATENT DOCUMENTS

| | | | |
|---|---|---|---|
| 2844528 | 4/1979 | Germany | 226/17 |

*Primary Examiner*—Daniel P. Stodola
*Assistant Examiner*—Emmanuel M. Marcelo
*Attorney, Agent, or Firm*—Carmen Santa Maria

[57] ABSTRACT

A lock-out device for an apparatus which guides strips of material toward a tire-building drum and which maintains the strip centered by compensating for minor variations in strip width. A pair of guide rails are adjustably mounted on a support housing and contain strip-engaging rollers which form a guide path for the strip moving therebetween. A panograph linkage is mounted on the housing and connects the guide rails for simultaneous movement of the rails toward and away from each other. A biasing mechanism, such as a spring or weight, biases the rails toward each other and the rollers into guiding engagement with the edges of the strip, and enables the guide rails to automatically move inward or outward to compensate for variations in strip width. The lock-out device includes a pressure-actuated piston which engages one of the guide rails, and when actuated, moves both rails apart and out of engagement with the longitudinal edges of the strip until the leading edge of the strip has been aligned and wrapped partially on the drum, and an angled front edge of the strip has moved beyond the guide rollers. The piston then is retracted and the biasing mechanism is operatively engaged with the guide rails to maintain the strip centered as it moves between the rails and around the tire-building drum.

7 Claims, 4 Drawing Sheets

LOCK-OUT DEVICE FOR THREADING IN A STRIP GUIDE APPARATUS

BACKGROUND OF THE INVENTION

1. Technical Field

The invention relates to a guide apparatus, and in particular, to an apparatus for guiding a strip of material to a tire-building drum. More particularly, the invention relates to a guide apparatus which maintains a material strip centered as it moves through the apparatus for accurate placement and alignment of the strip on an adjacent tire-building drum. Even more particularly, the invention relates to a lock-out device incorporated into the guide apparatus for temporarily moving spaced guiding elements out of engagement with the strip until the strip is centered with respect to the tire-building drum.

2. Background of the Invention

Apparatus of the type in which the present invention is incorporated, is generally referred to in the tire-building art as a "server" or "guide", and typically includes a flat table or plate which is positioned in operative position adjacent a tire-building drum. On the upper surface of the guide plate or table are transversely movable guide members or rails selectively adjustable to various predetermined spacings established by the width of the particular flat tire component strip being applied to the drum.

Heretofore, these guide rails or guide members have been moved transversely to the surface of the guide plate by various mechanisms. For example, in U.S. Pat. No. 1,711,074, a shaft and drive sprocket has been provided with detent fingers extending radially of the shaft and selectively engaged in a spring detent fixed to a support plate. Manual rotation of the sprocket shaft would move from one position to the next, thus establishing a desired number of preselected locations for the spaced guide members.

U.S. Pat. No. 3,170,829 shows another guide apparatus for a tire-building machine which uses a chain drive linkage for setting the spacing between the guide rails or fences. Coil springs are used to bias the guides away from each other and toward an outward position out of engagement with the strip material being conveyed therebetween. The guide fence members are in engagement with a latch bar, and one or more control stops are positioned, such that the latch bar will engage the control stop to position the guide fence members for different widths of tire components.

U.S. Pat. No. 3,269,627 shows another type of guide mechanism which is used for hot strip material in which the two spaced fences and guides are moved by a piston cylinder assembly and a rotatable shaft for adjusting the position between the two guides.

U.S. Pat. No. 4,750,660 discloses another guide apparatus for sheet or strip material in which the guide rails are positioned by a rotatable threaded shaft and guide rails, and a positioning cylinder for setting the desired spacing between the rails. A lock mechanism is provided for the piston rods to secure the sheet guides in a specific position. The lock mechanism may be pneumatic, electromagnetic, or other convenient arrangement. Preset blocks are positioned by the engagement of expandable portions of the air cylinders with the engagement portions of the block, which prevent the preset blocks from being repositioned after the air cylinders disengage the engagement positions.

U.S. Pat. No. 4,961,813 shows a guide mechanism for sheet or strip material for a tire-building drum in which the spacing between the guide members is achieved by a drive belt and drive motor. Rollers, which are located adjacent to the edges of the conveyor, are used to shift the leading edge of the strip material toward the longitudinal centerline of the conveyor. A motor and belt will enable the rollers to be positioned with respect to the strip material, and sensors determine the width of the strip material and enable the motor to adjust accordingly.

Although these prior guide devices and apparatus provide for the accurate setting of the guide fences or rails, they do not provide for the automatic simultaneous adjustment of the guide rails in order to compensate for increased or decreased strip widths which can occur in many strip components while being fed to a tire-building drum. This can result in the moving strip being moved off-center, and, therefore, inaccurately delivered to the tire-building drum. As the complexity of the tire structure has increased, the necessity for extreme accuracy in positioning the guide members or guide rails for delivery of the tire strip component has become more critical, especially when used with automated tire-making equipment.

Many of the above problems are overcome by the guide apparatus described in co-pending application Ser. No. 08/388,705, which is assigned to the same assignee as the present invention. In this apparatus, a spring or weight-biasing mechanism provides a constant biasing force on the strip-engaging rollers mounted on the spaced guide rails. The biasing force enables the guide rails to automatically compensate for various width changes, both increases and decreases, in the strip.

One problem that arises when utilizing guide devices which include such a spring- or weight-biased mechanism for maintaining the strip centered, as described in the above-referenced pending patent application, is that the biasing force on the rollers will force the tip of a strip of material which has a leading edge cut at an angle off-center. This is due to the fact that the biasing rollers will initially engage only one longitudinal edge of the strip until the front angled end has passed beyond the rollers, after which the biasing force of the guide rollers apply equal force to both longitudinal edges of the strip.

None of the prior guide devices and apparatus discussed above provide any device for temporarily disengaging a biasing mechanism which exerts a centering force on the strip edges until the strip material is properly set on the tire-building drum.

Therefore, the need exists for a guide apparatus used primarily with a tire-building drum, which apparatus includes a device which temporarily removes the biasing force exerted by the guide rollers on the edges of the strip until a leading angled end of the strip has been accurately positioned on a tire-building drum, after which the device will enable the biasing force to be reapplied on the guide rails to automatically compensate for variations in strip width as the strip moves toward the tire-building drum and through the server to maintain the strip centered in the server to provide accurate delivery to the tire-building drum.

SUMMARY OF THE INVENTION

Objectives of the invention include providing a lock-out device for a guide apparatus for tire-building machines, which guide apparatus will maintain the strip component centered, irrespective of minor variations in strip width, by automatically moving a pair of spaced guide rails and associated rollers toward and away from the strip simultaneously on both sides of the strip, to maintain the strip centered on its delivery axis.

Another objective of the invention is to provide such a lock-out device which, when actuated, temporarily retracts a biasing force of the guide rollers from the edges of the strip until a leading angled end of the strip has been accurately positioned on the tire-building drum, after which the device is reactivated, enabling the biasing force to be reapplied to the longitudinal edges of the strip to maintain it centered as it moves through a server.

A further objective of the invention is to provide such a lock-out device and strip guide apparatus in which the automatic width compensation feature and temporary lock-out feature can be incorporated easily into existing servers without material alterations, reducing the cost to retrofit existing guide apparatus, and requiring a minimum number of additional components in the construction of new tire-building servers or guide apparatus containing the lock-out device.

A still further objective of the invention is to provide such a lock-out device which is actuated by a relatively simple and inexpensive pneumatic-controlled piston cylinder mechanism.

Still another objective of the invention is to provide such a lock-out device in a guide apparatus which uses a panograph linkage mechanism to simultaneously move both guide fences or rails equally outwardly with respect to the centerline of the guide upon actuation of the lock-out device, and which will move the rails inwardly upon reactivation of the lock-out device to maintain the strip being conveyed therebetween centered regardless of the strip width.

A further objective of the invention is to provide such a lock-out device which can be synchronized with a feed motor roller clamp and with the drive mechanism of the tire building drum, to provide for the proper sequence and operation of the device to properly position the tip of an angled end of the strip on a tire-building drum, followed by the rotation of the drum at a desired speed for forming the tire component.

These objectives and advantages are obtained by a guide apparatus for delivering strip material to a tire-building machine, the general nature of which may be stated as including a support housing having a longitudinally extending strip material path therethrough; a pair of spaced longitudinally extending guide rails connected together for simultaneous movement toward and away from each other transversely with respect to the longitudinal path of the support housing; guide means mounted on each of the guide rails for guiding engagement with a strip of tire-building material moving longitudinally between the guide rails; biasing means operatively engageable with at least one of the guide rails for biasing the rails toward each other and for moving the guide means into engagement with a strip of material moving between said rails to maintain said strip centered within the housing as it moves therethrough; and lock-out means operatively engageable with at least one of the guide rails for moving said guide rails outwardly away from each other and for maintaining the guide means temporarily out of engagement with the strip of tire-building material.

BRIEF DESCRIPTION OF THE DRAWINGS

A preferred embodiment of the invention, illustrative of the best mode in which applicant has contemplated applying the principles, is set forth in the following description and is shown in the drawings and is particularly and distinctly pointed out and set forth in the appended claims.

Similar numerals refer to similar parts throughout the drawings.

DESCRIPTION OF THE PREFERRED EMBODIMENT

A preferred type of a strip guide apparatus in which the lock-out device of the present invention will be incorporated, is indicated generally at 1, and is shown particularly in FIGS. 1–5. Apparatus 1 preferably is of the type shown in the above-referenced copending patent application Ser. No. 08/388,705. Apparatus 1 includes a support housing, indicated generally at 2, which includes a pair of spaced parallel side frame members 3 which are attached to or mounted adjacent a server or guide table 4, and extend vertically upwardly therefrom.

Figure 8:
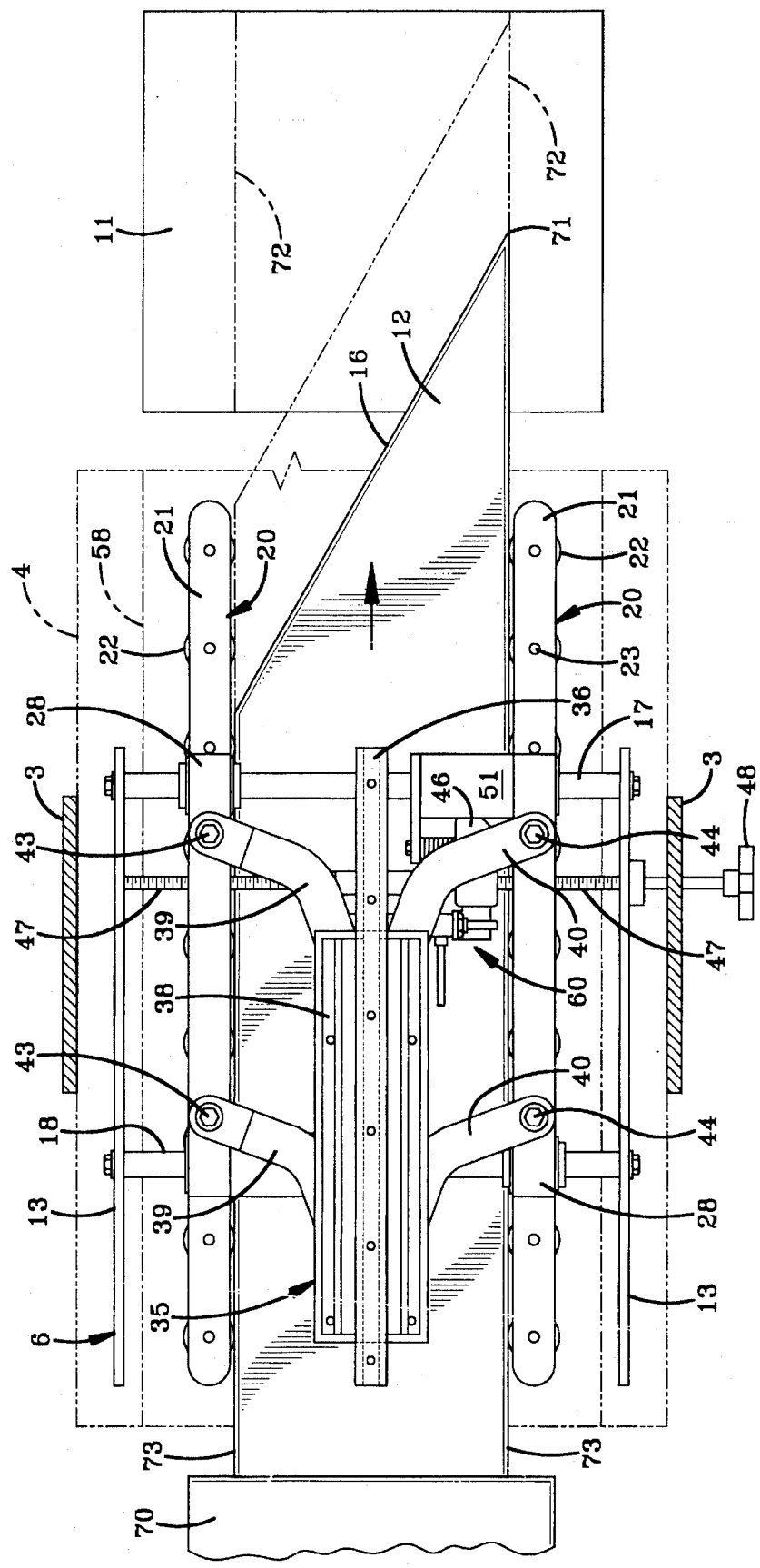
FIG. 8 is a top plan view similar to FIG. 4, with portions broken away and in section, showing a strip of tire-building material being placed on a tire-building drum.

A subframe assembly, indicated generally at 6, is adjustably mounted on and extends between side frame members 3 by a pair of spaced parallel horizontally extending support rods 7. A threaded shaft 8 operated by a hand wheel 9, extends through one of the housing side frame members 3, and is operatively connected to subframe assembly 6. Rotation of hand wheel 9 will move subassembly 6 transversely between side frame members 3, as indicated by arrow A in FIG. 3. This enables subframe assembly 6 to be transversely adjusted between the side frame members of the housing with respect to a longitudinal axis 10 of housing 2, which forms a centerline for the path along which a strip of tire-building material 12 will move, shown in dot-dash lines in FIG. 3. Tire strip 12 is maintained centered by apparatus 1 as it moves longitudinally toward a usual tire-building drum 11 located at the discharge end of the apparatus, as shown in FIG. 8. In the preferred embodiment, strip 12 is a steel-reinforced calendered strip used as a tire body stabilizer ply, and will have an angled front edge 16.

Subframe assembly 6 further includes a pair of longitudinally extending side frame members 13 and a top frame member 14 extending therebetween. A top cover 15 preferably is mounted on top frame member 14 to cover the internal mechanism within the housing as a safety feature. A pair of slide rods 17 and 18 extend between and are mounted on frame members 13 in a transverse direction with respect to longitudinal axis 10. A pair of strip guide rail assemblies, indicated generally at 20, are movably mounted on slide rods 17 and 18, and extend in a spaced parallel relationship longitudinally along the strip guide path on opposite sides of longitudinal axis 10.

Figure 1:
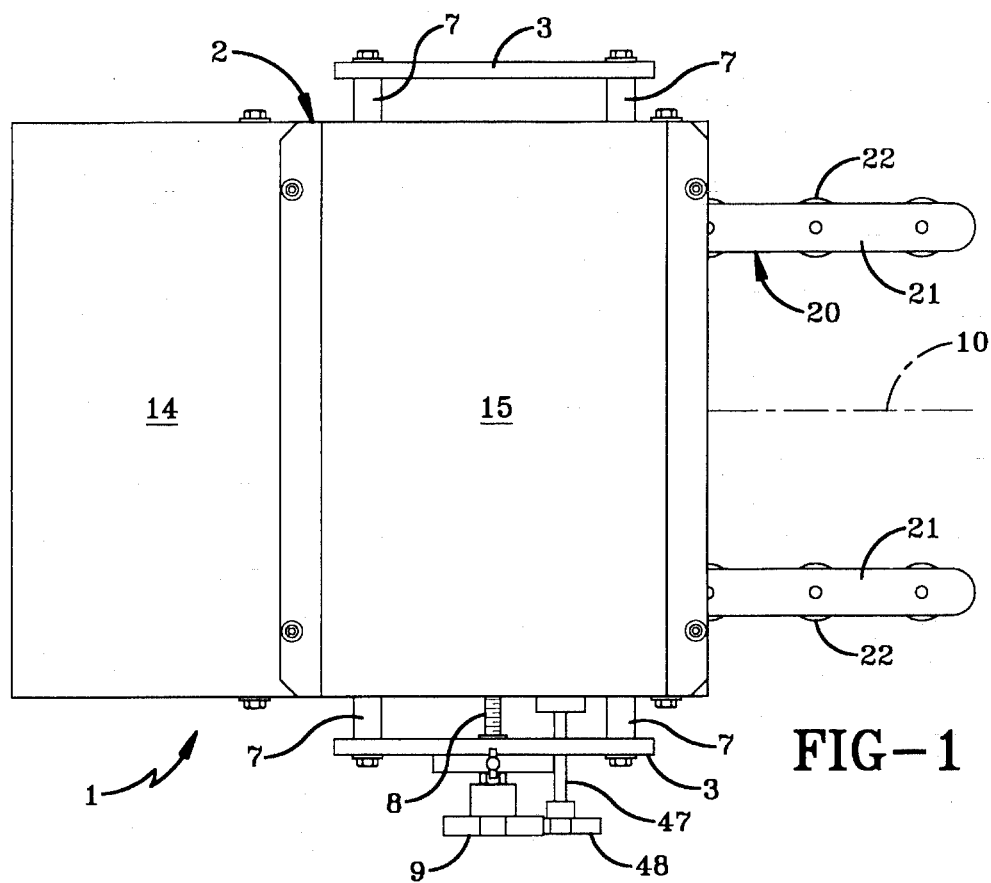
FIG. 1 is a top plan view of a type of strip guide apparatus in which the lock-out device of the present invention may be incorporated.
Figure 2:
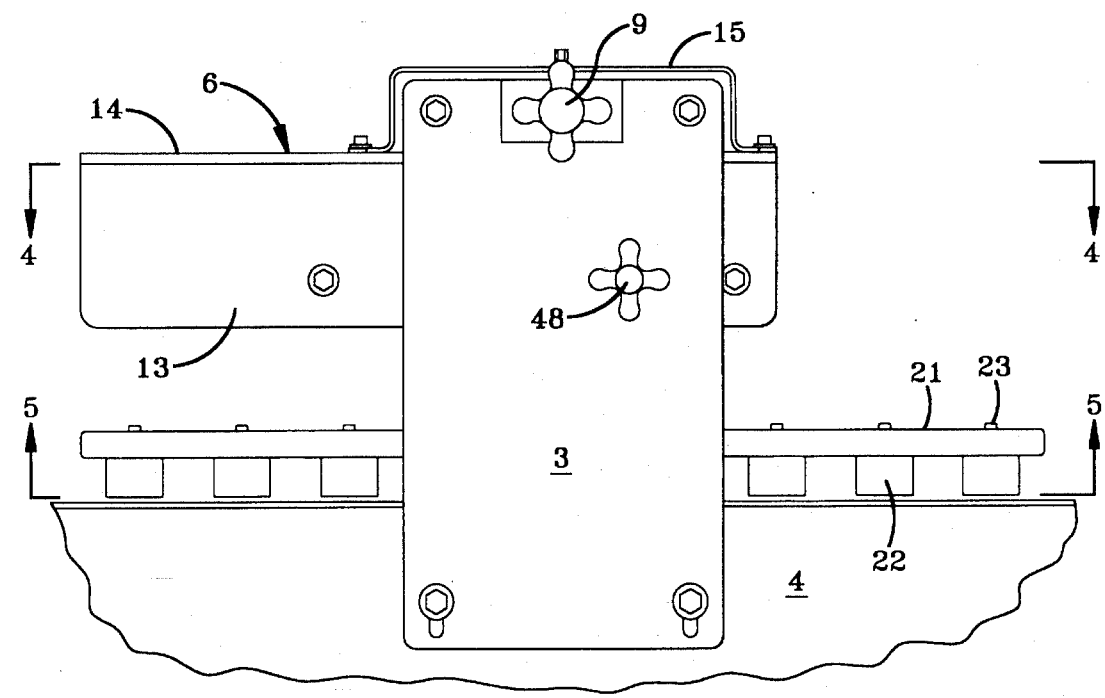
FIG. 2 is a partial side elevational view of the strip guide apparatus of FIG. 1 with portions removed.
Figure 3:
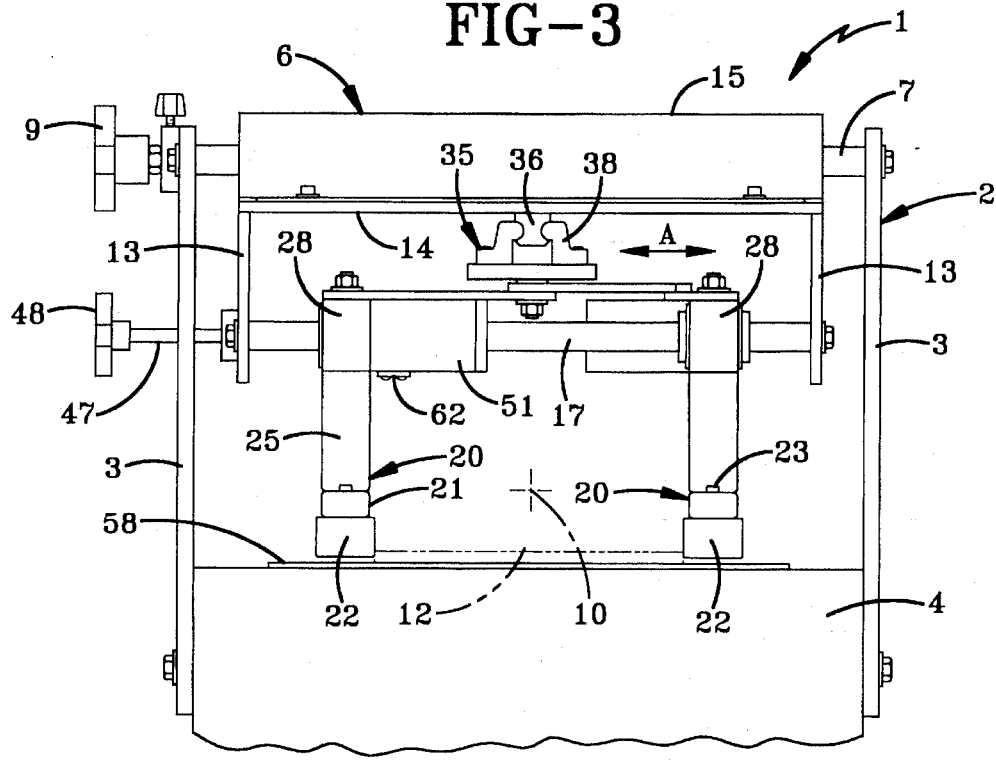
FIG. 3 is a fragmentary front elevational view of the strip guide apparatus of FIG. 2, with a strip of tire-building material being shown in dot-dash lines.
Figure 4:
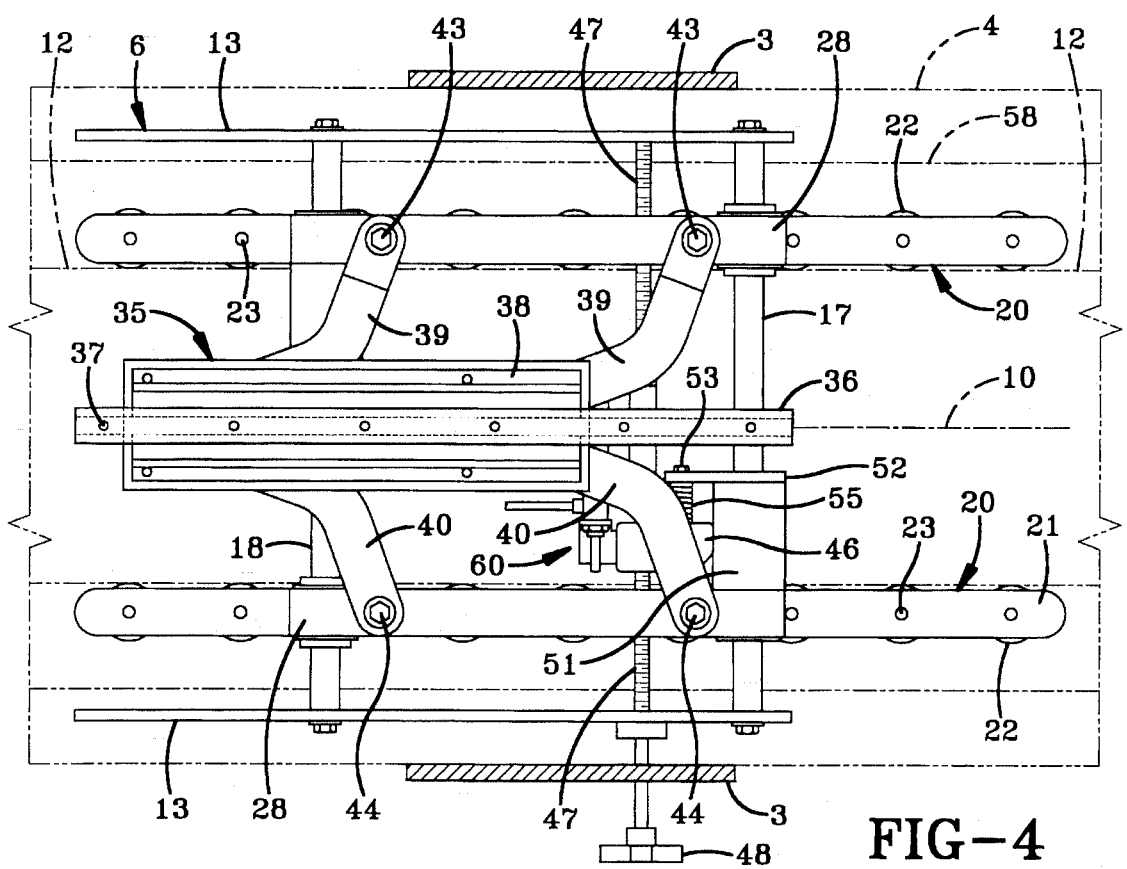
FIG. 4 is a fragmentary sectional view taken on line 4—4, FIG. 2.

Each guide rail assembly 20 includes a guide rail 21 and a plurality of guide rollers 22, which are rotatably mounted thereon by pins 23. Rollers 22 are spaced longitudinally along the guide rail for engagement with the edges of strip 12, as shown in FIGS. 3 and 8. Each guide rail 21 is mounted by front and rear mounting brackets 25 which are mounted on bearing blocks 28 through which shafts 17 and 18 extend, for movably mounting guide rails assemblies 20 thereon.

As shown particularly in FIGS. 3, 4, 5 and 8, a panograph linkage assembly, indicated generally at 35, is movably mounted on housing 2, and particularly on subframe assembly 6. Linkage assembly 35 is operatively engaged with guide rail assemblies 20 for simultaneous movement of the rail assemblies toward and away from each other to automatically compensate for variations in the width of strip 12. Linkage assembly 35 includes a slide rail 36 which is mounted by a plurality of bolts 37 to top frame member 14 and extends longitudinally therealong, coinciding with longitudinal axis 10. A slide block or plate 38 is slidably mounted on slide rail 36. Two pairs of link arms 39 and 40 have inner ends pivotally mounted on slide block 38 (FIG. 5) by pivot bolts 42. The outer ends of link arms 39 and 40 are pivotally mounted by bolts 43 and 44, respectively (FIG. 4), to a respective guide rail assembly 20. Panograph linkage assembly 35 provides for the simultaneous inward and outward movement of guide rail assemblies 20 upon any force being applied to one of the rail assemblies, thus maintaining the individual guide rails at an equal transverse distance from longitudinal axis 10 or the centerline of slide rail 36 and slide block 38.

An adjustment block 46 (FIGS. 6 and 7) is formed with an internally threaded hole 49 through which a threaded adjustment shaft 47 extends and is threadably engaged therewith, for moving block 46 therealong as the shaft is rotated. Shaft 47 extends transversely between side frame members 13 and through one of the outer side frame members 3, and is rotatably controlled by a hand wheel 48. Shaft 47 and block 46 are not connected directly to either of the guide rails 21.

A biasing mechanism, indicated generally at 50 (FIGS. 6 and 7), is mounted on slide rod 17 and is operatively engaged with adjustment block 46. Biasing mechanism 50 includes a mounting block 51 which has internal bearings (not shown) for freely slidably mounting it on slide rod 17. A mounting bracket 52 is attached to block 51 by bolts or other attachment means and extends longitudinally therefrom. Block 51 is also secured by these same bolts or other attachment means to the adjacent guide rail 21. A bolt 53 extends from an outer end of bracket 52 and through an opening 54 formed in block 46 and is secured to adjacent guide rail 21. A compression coil spring 55 is mounted on bolt 53 and is trapped between adjustment block 46 and bracket 52. A stop 56 preferably is mounted in a fixed position at the center of shaft 47 to engage adjustment block 46, limiting the inward travel thereof to prevent damage to the guide rail assemblies and the panograph mechanism. Biasing mechanism 50 may be weight actuated instead of spring actuated, as described in the previously referenced copending application Ser. No. 08/388,705.

The operation of guide apparatus 1 and its set-up is as follows. Subframe assembly 6 is centered with respect to longitudinal axis 10 by the rotation of shaft 8 and hand wheel 9. Hand wheel 48 is then rotated, rotating shaft 47, moving block 46 inwardly toward axis 10, which pushes on spring 55, bringing with it slide block 51, mounting bracket 52, and the attached guide rail assembly 20. This inward movement of the attached guide rail assembly will cause the opposite guide rail assembly 20 to move toward axis 10 and strip 12 by the connections to linkage assembly 35. Shaft 47 is rotated until the rollers 22 are in abutting relationship with the edges of a strip 12, as shown in FIGS. 3 and 8. Then shaft 47 is rotated several more turns, which will compress spring 55, causing a gap to appear between adjustment block 46 and the adjusted guide rail 21 (FIG. 7) which places tension on the strip by the spring-biased rollers 22. Should the strip get narrower during the tire-building process, the tension of spring 55 will move the guide rollers toward each other simultaneously in unison through linkage assembly 35, keeping constant pressure on the strip and, most importantly, keeping the strip centered with respect to axis 10, which, in turn, aligns the strip with tire-building drum 11. Should the strip get wider during the tire-building process, the guide rollers move outwardly, causing the spring to be compressed, again moving both guide rails in unison in an equal transverse direction with respect to axis 10, to maintain the strip centered therebetween.

Figure 5:
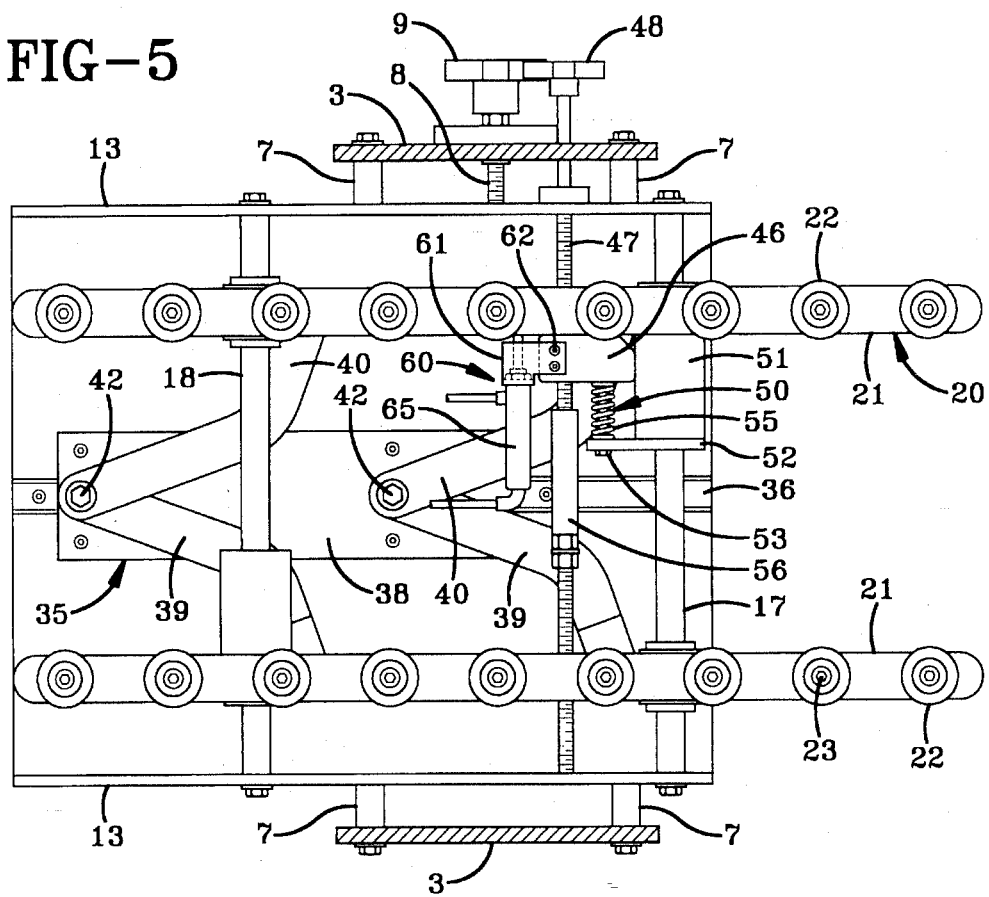
FIG. 5 is a fragmentary sectional view taken on line 5—5, FIG. 2.
Figure 6:
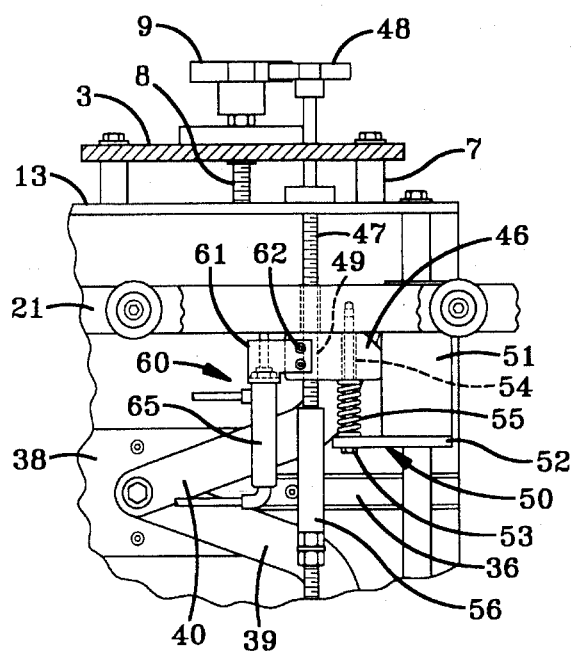
FIG. 6 is a fragmentary view, with portions broken away and in section, showing the lock-out device in a retracted position.
Figure 7:
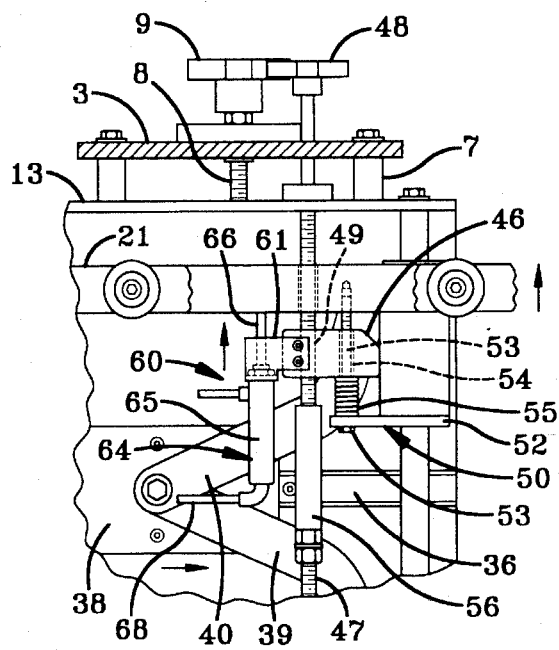
FIG. 7 is a fragmentary view similar to FIG. 6, showing the lock-out device in an extended position.

In accordance with the invention, a lock-out device, indicated generally at 60, is mounted on threaded shaft 47 and is operatively engageable with the guide rail assembly 20 located adjacent spring-biasing mechanism 50, for moving the pair of guide rail assemblies outwardly a short distance until the angled front edge 16 of strip 12 is properly placed and positioned on tire-building drum 11, as shown in FIG. 8. Lock-out device 60 (FIGS. 6 and 7) includes a bracket 61 which is secured by bolts 62 to adjustment block 46. A pressure-actuated device, indicated generally at 64, is mounted on bracket 61. In the preferred embodiment, device 64 includes a cylinder 65 and a pressure-actuated piston 66. Cylinder 65 preferably is connected to a source of pressurized air (not shown) by a pair of air lines 68. Piston 66 preferably is a double-actuated piston wherein pressurized air is fed through a selected air line 68 for moving the piston outwardly, as shown in FIG. 7, or in an inward retracted position, as shown in FIGS. 5 and 6. If desired, piston 66 can be hydraulically actuated, or replaced by an entirely different type of actuating device.

The operation of lock-out device 60, is best shown in FIGS. 6, 7 and 8. Prior to placement of strip 12 on drum 11, pressurized air is fed to cylinder 65, causing piston 66 to move from its retracted position of FIG. 6 outwardly to its extended position of FIG. 7, wherein its abutting engagement with adjacent guide rail assembly 20 will move both guide rail assemblies 20 transversely outwardly through panograph linkage assembly 35 to a position as shown in FIG. 7. In this set-up position, rollers 22 preferably will be approximately 1 to 2 mm from longitudinal edges 73 of strip 12. A usual motor roller clamp 70, which is shown diagrammatically in FIG. 8, is engaged with strip 12, and is actuated to positively drive and advance strip 12 to the position, as shown in FIG. 8, wherein tip 71 of angled front edge 16 is placed on an adjacent laser light guide 72 which is illuminated on tire-building drum 11 in a usual manner, generally from an overhead source (not shown). As indicated above, the spacing between guide rails 21 has been adjusted for the placement of tip 71, as described above, by the movement of subassembly 6 and the rotation of hand wheel 48.

Thus, cylinder 65 and piston 66 will open the guide rails approximately 3 to 5 mm to achieve the desired spacing of guide rollers 22 with respect to longitudinal edges 73 of strip 12. After tip 71 of strip 12 is placed on the appropriate laser light guideline 72, motor roller clamp 70 advances strip 12 approximately twelve inches in coordination with the rotation of tire-building drum 11 to ensure that the strip is properly placed on the tire-building drum and secured thereto by the natural tackiness of the rubber, and that longitudinal edges 73 are aligned with laser guides 72, as shown in dot-dash lines in FIG. 8. An appropriate control mechanism will supply air to the appropriate side of cylinder 65, retracting piston 66 to its retracted position, as shown in FIGS. 5 and 6, permitting biasing spring 55 to move the guide rollers into engaged position with longitudinal edges 73, as shown in FIG. 8, maintaining a biasing force thereon to compensate for minor differences in the strip width.

Simultaneously with the actuation of piston 66 and the disengagement of motor roller clamp 70, the speed of tire-building drum 11 will be increased to its normal operating speed for paying out the appropriate length of strip 12 to complete the desired revolution of the strip around the tire-building drum. The advancement of strip 12 the desired distance onto and partially around tire-building drum 11 prior to the biasing force being exerted on the strip by rollers 22, will ensure that the angled front edge 16 of strip 12 has sufficiently cleared the frontmost guide rollers 22 so that the guide rollers are engaged with both parallel longitudinal edges 73 of the strip to maintain the strip in its centered position. If the guide rollers were moved into engagement with the strip edges by biasing mechanism 50 at a position where the angled front edges 16 was adjacent one set of the guide rollers, it would move tip 71 off center, since a counterbalancing force will not be exerted on the opposite strip edge until the strip has reached the dot-dash position of FIG. 8. Thus, lock-out device 60 temporarily moves the spring-biased guide rollers out of engagement with the strip edges until the strip having an angled front edge, has been properly placed and wound partially around drum 11.

Accordingly, the improved strip guide apparatus, and in particular, the lock-out device of the present invention, provides a simple mechanism for properly positioning a strip of tire-building material, especially a strip having an angled front or leading edge, on a tire-building drum prior to moving the strip through the guide apparatus along a predetermined center line.

Accordingly, the lock-out device for a strip guide apparatus for a tire-building machine of the present invention is simplified, provides an effective, safe, inexpensive, and efficient device which achieves all the enumerated objectives, provides for eliminating difficulties encountered with prior devices, and solves problems and obtains new results in the art.

In the foregoing description, certain terms have been used for brevity, clearness and understanding; but no unnecessary limitations are to be implied therefrom beyond the requirement of the prior art, because such terms are used for descriptive purposes and are intended to be broadly construed.

Moreover, the description and illustration of the invention is by way of example, and the scope of the invention is not limited to the exact details shown or described.

Having now described the features, discoveries and principles of the invention, the manner in which the improved lock-out device for tire-building machines is constructed and used, the characteristics of the device, and the advantageous, new and useful results obtained; the new and useful structures, elements, arrangements, parts and combinations, are set forth in the appended claims.

I claim:

1. An apparatus for guiding strip material to a tire-building drum, including:

a support housing having a longitudinally extending strip material path therethrough;

a pair of support rods mounted on the housing and extending transversely across the longitudinally extending material path;

a pair of spaced longitudinally extending guide rails mounted on the support rods and connected together for simultaneous movement toward and away from each other only transversely with respect to the longitudinal path of the support housing;

guide means mounted on each of the guide rails for guiding engagement with a strip of tire-building material moving longitudinally between the guide rails;

biasing means operatively engageable with at least one of the guide rails for biasing the rails toward each other and for moving the guide means into engagement with a strip of material moving between said rails to maintain said strip centered within the housing as the strip of material moves therethrough; and lock-out means operatively engageable with at least one of the guide rails for moving said guide rails outwardly away from each other and for maintaining the guide means temporarily out of engagement with the strip of tire-building material, said lock-out means including a cylinder and a pressure-actuated piston, said piston directly engaging one of the rails whereon outward movement of the piston engages and moves said one guide rail outwardly only in a transverse direction on said support rods.

2. The apparatus defined in claim 1 in which the cylinder is mounted on an adjustment block, said block being movably mounted on a threaded shaft which is mounted on and extends transversely across the material path of the support housing; in which the biasing means is a compression coil string; and in which said spring is operatively engaged between said adjustment block and the said one guide rail.

3. The apparatus as defined in claim 2 including means for rotating the shaft to adjust the position of the adjustment block thereon to adjust the spacing between the guide rails.

4. The apparatus as defined in claim 3 in which the means for rotating the shaft is a manually operated hand wheel.

5. The apparatus as defined in claim 1 including linkage means operatively engaged with the guide rails for moving said guide rails simultaneously toward and away from each other.

6. The apparatus as defined in claim 5 in which the linkage means is a panograph having a slide block longitudinally slidably mounted on the housing and two pairs of link arms pivotally mounted at first ends to the slide block and at second ends to the guide rails.

7. The apparatus as defined in claim 6 in which a slide rail is mounted on the housing and extends along a longitudinal axis of the strip material path; and in which the slide block of the linkage means is slidably mounted on the slide rail.

* * * * *